United States Patent

[11] 3,572,756

[72] Inventor Joseph C. Metzger
 4755a Alma, St. Louis, Mo. 63116
[21] Appl. No. 819,766
[22] Filed Apr. 28, 1969
[45] Patented Mar. 30, 1971

[54] CHAIN-DRIVEN VEHICLES
 3 Claims, 5 Drawing Figs.
[52] U.S. Cl. .................................................. 280/238
[51] Int. Cl. ................................................... B62m 25/06
[50] Field of Search .......................................... 280/238,
 236, 237; 192/46, 45.1, 48.92; 180/72

[56] References Cited
 UNITED STATES PATENTS
 346,667  8/1886  Maret ........................... 280/238

| 510,227 | 12/1896 | Acklin ........................... | 280/238 |
| 626,257 | 6/1899 | Whipple ........................ | 280/238 |

FOREIGN PATENTS

| 614,332 | 12/1945 | Great Britain ................ | 280/238 |

*Primary Examiner*—Benjamin Hersh
*Assistant Examiner*—Robert R. Song
*Attorney*—Joseph A. Fenlon, Jr.

ABSTRACT: This invention relates to a chain-driven vehicle in which a new and unique selectable sprocket engagement system is utilized to provide an extremely wide range of power transfer ratios between the driving pedals and the driven wheels.

PATENTED MAR 30 1971 3,572,756

INVENTOR
JOSEPH C. METZGER

BY *Joseph A. Fenlon*

ATTORNEY

CHAIN-DRIVEN VEHICLES

This invention relates to chain-driven vehicles.

It is the object of this invention to provide a chain-driven vehicle in which the speed is selectably variable over wide ranges.

With the above and other objects in view my invention resides in the unique and novel form, construction, arrangement and combination of parts shown in the drawings and claimed in the claims.

Figure 6:
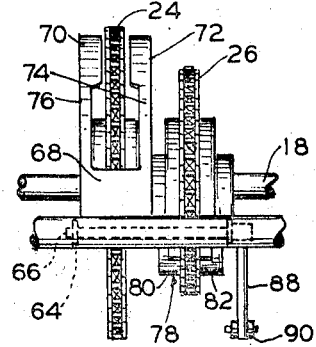
Figure 1:
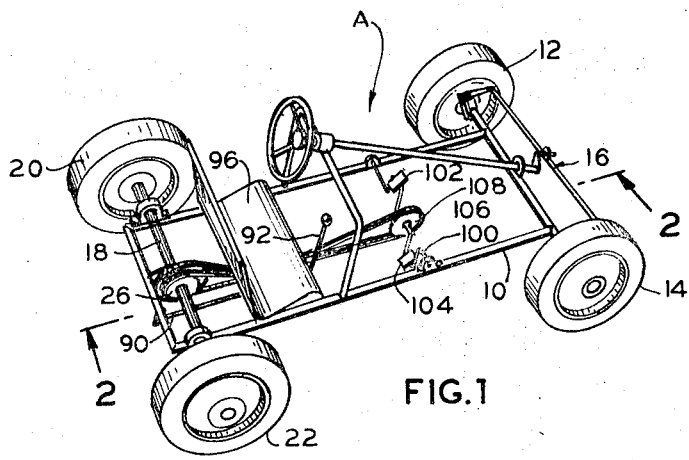
FIG. 1 is a perspective view of a chain-driven vehicle provided with a preferred embodiment of my invention.
Figure 2:
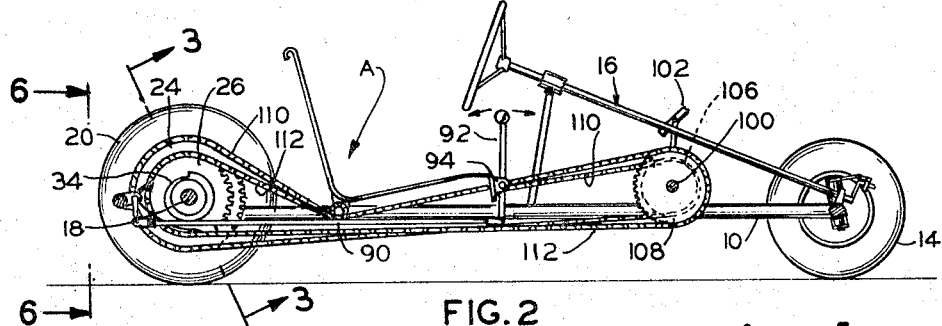
FIG. 2 is an enlarged sectional view taken along lines 2–2 of FIG. 1.
Figure 4:
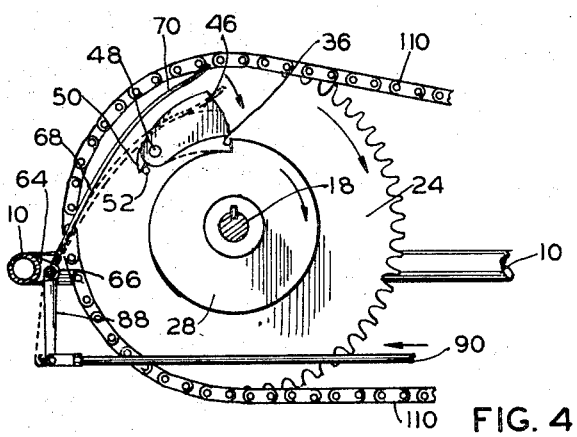
Figure 3:
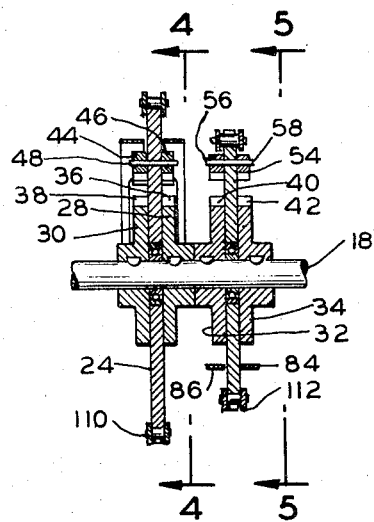
FIG. 3 is an enlarged fragmentary sectional view taken along lines 3–3 of FIG. 2.
Figure 5:
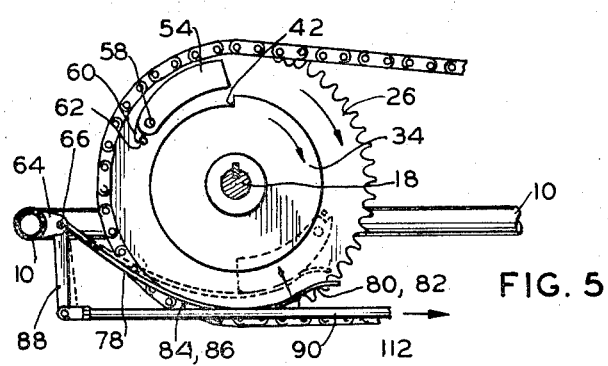

FIGS. 4 and 5 are fragmentary sectional views taken along lines 4–4 and 5–5 respectively of FIG. 3; and FIG. 6 is an enlarged rear elevational view taken along lines 6–6 of FIG. 2.

Referring now in more detail, and by reference characters to the drawings which show a preferred embodiment of my invention, A designates a vehicle comprising a chassis 10, a pair of forward wheels 12,14 rotatably mounted in the chassis 10, a conventional steering system 16, a rear axle 18 journaled on the chassis 10, a driven wheel 20 secured to the rear axle 18, and a free wheel 22 rotatably mounted on the axle 18, all in the conventional manner.

Intermediate the wheels 20,22, the axle 18 is provided with a pair of spaced sprocket wheels 24,26, of different diametral size, each of which is freely rotatable on the axle 18. A pair of spaced ratchet wheels 28,30, are secured to the axle 18 in slightly spaced relation on opposing sides of the sprocket wheel 24 and similarly a pair of spaced ratchet wheels 32,34 are secured to the axle 18 in slightly spaced relation on opposing sides of the sprocket wheel 26. The peripheries of the ratchet wheels 28,30,32 and 34 are respectively provided with detent faces 36,38,40 and 42.

Radially outwardly of the periphery of the ratchet wheels 28,30, the sprocket wheel 24 is provided with a pair of pawls 44,46 which are secured to a common rod 48 which is rotatably mounted in the sprocket wheel 24. The pivotal end of the pawl 46 is provided with a stop 50 which cooperates with an outwardly projecting element 52 on the sprocket wheel 24 to limit the radially outward pivotal movement of the pawls 44,46.

Similarly, a pair of pawls 54,56 are secured to opposing ends of a common rod 58 which is rotatably mounted in the sprocket wheel 26, radially outward of the periphery of the ratchet wheels 32,34; and further similarly, the pivotal end of the pawl 56 is provided with a stop 60 which cooperates with an outwardly projecting element 62 on the sprocket wheel 26 to limit the radially outward pivotal movement of the pawls 54,56.

Mounted on the rear of the chassis 10 adjacent the sprocket wheels 24,26 is a bracket 64 in which is journaled a rod 66. Secured to the rod 66 in alignment with the sprocket wheel 24 is a flexible arm 68 provided on its outer end with a pair of spaced tongues 70,72 which are disposed on opposing sides of the sprocket wheel 24 by narrow armlike elements 74,76, respectively, as best seen in FIG. 4. Secured to the rod 66 in alignment with the sprocket wheel 26 is a flexible arm 78 also provided on its outer end with a pair of spaced tongues 80,82 which are disposed on opposing sides of the sprocket wheel 26 by narrow armlike elements 84,86, as best seen in FIG. 5.

Secured to the end of rod 66 is one end of a linkage 88 which is pivotally attached at its other end to one end of a shift rod 90. The end of the shift rod 90 is attached to one end of a shift lever 92 which is pivotally attached to a bracket 94 mounted on the forward portion of a seat 96 located in the center of the chassis 10.

Journaled in the chassis 10 forward of the seat 96 is a pedal shaft 100 provided with a pair of spaced foot pedals 102,104 and also provided with a pair of spaced drive sprockets 106, 108, which are of different diametral size and which are located on the pedal shaft 100 in substantial alignment with the sprocket wheels 24,26.

A first endless chain 110 couples the diametrally larger sprocket wheel 24 and the diametrally smaller drive sprocket 106. A second endless chain couples the diametrally smaller sprocket wheel 26 and the diametrally larger drive sprocket 108. As the shaft 100 is rotated, the endless chain 110,112 transfer power to the sprocket wheels 24,26 respectively. Because of the difference in diametral sizes of the drive sprockets 106 and 108 and the sprocket wheels 24 and 26, the sprocket wheel 26 will be rotated at a higher angular velocity than the sprocket wheels 24.

In use, the operator places the shift lever 92 in the low gear position in which the flexible arm 68 is pivoted toward the axle 18 and the tongues 70,72 are brought into engagement with the pawls 44,46 respectively, urging the pawls 44,46 against the periphery of the ratchet wheels 28,30. Thereafter, the operator manually starts the vehicle A in motion and simultaneously begins pedaling the shaft 100 which transfers driving power at a low gear ratio from the shaft 100 to the axle 18 through the endless chain 110 and the ratchet wheels 28,30. As the speed of the vehicle A is increased, the shift lever 92 is moved from the low gear position to the high gear position which the tongues 70,72 are lifted away from the pawls 44,46, respectively, and the tongues 80,82 are urged against the pawls 54,56 respectively, biasing the pawls 54,56 inwardly against the ratchet wheels 32,34, transferring driving power at a higher angular velocity from the endless chain 112 to the rear axle 18. As the shaft 100 is thereafter rotated, the vehicle A is propelled at substantially higher velocity.

It should be here noted that the narrow armlike elements 74,76,84,86, merely provide clearance for the pawls 44,46,54,56, respectively, as the sprocket wheels 24,26 are rotated prior to gear engagement. It should also be noted that this invention is suited for use with more than two gear ratios, if required, and that I have elected to show this invention as a two gear system merely for the purpose of simplifying the disclosure.

It should be understood that changes, alterations, modifications and variations in the form, construction, arrangement and combination of the various parts may be made and substituted for those herein shown, without departing from the nature and principle of my invention.

Having thus described my invention, what I claim and desire to secure by Letters Patent is recited in the following claims.

I claim:

1. On a wheeled vehicle including a chassis and a plurality of wheels rotatably mounted thereon, a multiple-speed drive mechanism comprising a first shaft journaled on the chassis, first and second sprocket wheels secured to the first shaft in spaced separation from each other, said first sprocket wheel being diametrally larger than the second sprocket wheel, a second shaft journaled on the chassis and being secured to one of the wheels whereby said wheel will be driven as the second shaft is rotated, third and fourth sprocket wheels rotatably disposed about the second shaft, said third sprocket wheel being diametrally smaller than the fourth sprocket wheel, first means for holding the third sprocket wheel in alignment with the first sprocket wheel, second means for holding the fourth sprocket wheel in alignment with the second sprocket wheel, a first endless chain disposed about the first and third sprocket wheels, a second endless chain disposed about the second and fourth sprocket wheels, drive means for applying driving force to the first shaft, and control means for selectively coupling third and fourth sprocket wheels to the second shaft, said first means comprising first and second ratchet wheels secured to the second shaft on opposing sides of the third sprocket wheel, said second means comprising third and fourth ratchet wheels secured to the second shaft on opposing sides of the fourth ratchet wheel, and the control means including first and second pawls pivotally mounted on opposing sides of the third sprocket wheel, and third and fourth pawls pivotally mounted on opposing sides of the fourth sprocket wheel, and lever-operated means for selectively engaging the first and second pawls with the first and second ratchet wheels, respectively and the third and fourth pawls with the third and fourth ratchet wheels, respectively.

2. The device of claim 1 wherein the lever-operated means includes a shift lever operatively mounted on the chassis and a first arm pivotally mounted on the chassis in alignment with the third sprocket wheel and including first and second spaced fingers which are disposed on opposing sides of the third sprocket wheel in alignment with the first and second pawls, respectively.

3. The device of claim 1 wherein the lever-operated means includes a shift lever operatively mounted on the chassis, a first arm pivotally mounted on the chassis in alignment with the third sprocket wheel and including first and second spaced fingers which are disposed on opposing sides of the third sprocket wheel in alignment with the first and second pawls, respectively, a second arm pivotally mounted on the chassis in alignment with the fourth sprocket wheel and including third and fourth spaced fingers which are disposed on opposing sides of the fourth sprocket wheel in alignment with the third and fourth pawls, respectively, and linkage means for selectively urging the first and second fingers against the first and second pawls, respectively, and simultaneously urging the first and second pawls into engagement with the first and second ratchet wheels, respectively, when the shift lever is in one position, and also for urging the third and fourth fingers against the third and fourth pawls, respectively, and simultaneously urging the third and fourth pawls into engagement with the third and fourth ratchet wheels, respectively, when the shift lever is in a second position.